United States Patent
Niu et al.

(10) Patent No.: US 11,194,062 B2
(45) Date of Patent: Dec. 7, 2021

(54) NUCLEAR DETECTOR

(71) Applicant: RAYCAN Technology Co., Ltd. (Suzhou), Suzhou Jiangsu (CN)

(72) Inventors: Ming Niu, Suzhou Jiangsu (CN); Tong Liu, Suzhou Jiangsu (CN); Yuexuan Hua, Suzhou Jiangsu (CN); Yicheng Sun, Suzhou Jiangsu (CN); Qingguo Xie, Suzhou Jiangsu (CN)

(73) Assignee: RAYCAN Technology Co., Ltd. (Suzhou), Suzhou Jiangsu (CN)

( * ) Notice: Subject to any disclaimer, the term of this patent is extended or adjusted under 35 U.S.C. 154(b) by 113 days.

(21) Appl. No.: 16/623,038

(22) PCT Filed: Oct. 27, 2017

(86) PCT No.: PCT/CN2017/108097
§ 371 (c)(1),
(2) Date: Dec. 16, 2019

(87) PCT Pub. No.: WO2019/019449
PCT Pub. Date: Jan. 31, 2019

(65) Prior Publication Data
US 2020/0309969 A1    Oct. 1, 2020

(30) Foreign Application Priority Data
Jul. 28, 2017   (CN) .......................... 201710631228.4

(51) Int. Cl.
*G01T 1/20* (2006.01)
*G01T 1/29* (2006.01)
(Continued)

(52) U.S. Cl.
CPC ........ *G01T 1/20185* (2020.05); *G01T 1/1642* (2013.01); *G01T 1/202* (2013.01);
(Continued)

(58) Field of Classification Search
CPC ... G01T 1/1642; G01T 1/20185; G01T 1/202; G01T 1/2023; G01T 1/2026; G01T 1/2985
See application file for complete search history.

(56) References Cited

U.S. PATENT DOCUMENTS

| | | | | |
|---|---|---|---|---|
| 6,087,663 | A | * | 7/2000 | Moisan .................. G01T 1/202 250/367 |
| 2004/0155197 | A1 | * | 8/2004 | Tonami .................... G01T 1/20 250/368 |

(Continued)

FOREIGN PATENT DOCUMENTS

| | | |
|---|---|---|
| CN | 1673773 A | 9/2005 |
| CN | 102879798 A | 1/2013 |

(Continued)

OTHER PUBLICATIONS

Bergeron, M. et al. "Performance Evaluation of the LabPET APD-Based Digital PET Scanner" IEEE Transactions on Nuclear Science, Feb. 2009, vol. 56, Issue 1, pp. 10-16. (abstract).

(Continued)

*Primary Examiner* — Mark R Gaworecki
(74) *Attorney, Agent, or Firm* — Daniel J. Chalker; Edwin S. Flores; Chalker Flores, LLP (57) ABSTRACT

A nuclear detector, comprises a scintillation crystal array including a plurality of scintillation crystal bars of the same size arranged closely and in sequence, a light guide, and a photodetector array including a plurality of photodetectors arranged in sequence. The photodetectors have a cross-sectional area greater than that of the scintillation crystal bars, and the light guide includes a top surface coupled to the scintillation crystal array, an opposed bottom surface coupled to the photodetector array and a side surface. The light guide has a thickness in a range of 0.1 mm to 40 mm. The light guide further includes a slit adjacent to an edge of (Continued)

the light guide, and the slit is configured to extend from the top surface toward the bottom surface of the light guide and the slit has a depth in a range of 0.1 to 0.5 times the thickness of the light guide.

20 Claims, 6 Drawing Sheets

(51) Int. Cl.
  *G01T 1/164* (2006.01)
  *G01T 1/202* (2006.01)
(52) U.S. Cl.
  CPC .......... *G01T 1/2023* (2013.01); *G01T 1/2026* (2013.01); *G01T 1/2985* (2013.01)

(56) References Cited

U.S. PATENT DOCUMENTS

2004/0262527 A1* 12/2004 Ooi .................. G01T 1/202
  250/368
2005/0211906 A1* 9/2005 Tonami .................. G01T 1/202
  250/367
2014/0231655 A1* 8/2014 Dueppenbecker .... G01T 1/2985
  250/366

FOREIGN PATENT DOCUMENTS

| CN | 104049270 A | 9/2014 |
| CN | 105372693 A | 3/2016 |
| CN | 107167832 A | 9/2017 |

OTHER PUBLICATIONS

International Search Report [ISA/CN] PCT/CN2017/108097 dated May 4, 2018.
Li, Xiaoli et al. "Study of PET Detector Performance with Varying SiPM Parameters and Readout Schemes" IEEE Trans Nucl Sci. 2011 ; 58(3): 590-596. doi:10.1109/TNS.2011.2119378.
Wang, Luyao et al. "Performance evaluation of the Trans-PET® BioCaliburn® LH system: a large FOV small-animal PET system" 2015 Phys. Med. Biol. 60 137.

* cited by examiner

NUCLEAR DETECTOR

CROSS-REFERENCE TO RELATED APPLICATIONS

This application is the National Stage of International Application No. PCT/CN2017/108097, filed on Oct. 27, 2017, which claims priority to CN 201710631228.4, filed on Jul. 28, 2017, the contents of each application is incorporated by reference herein.

TECHNICAL FIELD

The disclosure relates to a radiation detection device, and more particularly to a nuclear detector.

BACKGROUND

In a nuclear detection equipment such as a gamma (γ) camera, a positron emission computed tomography (abbr. PET, Positron Emission Tomography) system, a radiation detector or a crystal performance detection device, the spatial resolution of a nuclear detector is an important indicator reflecting the performance of the nuclear detection equipment. For example, in the PET system, the spatial resolution reflects the PET system's ability to identify fine tissues, which is not only one of the two most important indicators in the PET system, but also one of the important indicators for evaluating the quality of PET images. As an imaging system, the PET system's fundamental evaluation standard lies in the quality of the reconstructed images, while high-quality reconstructed images require good spatial resolution, which has been the focus of optimization in the development of PET systems for more than a decade. Especially in an animal PET system, due to the size of the animals, a higher spatial resolution for the system imaging is required than in a clinical PET system.

In the state of art, nuclear detectors whose crystal bars are cut into a size less than 2.0 mm are generally referred to as high spatial resolution nuclear detectors. At present, high spatial resolution nuclear detectors are typically embodied in form of the following designs:

Firstly, by coupling a position-sensitive photomultiplier tube (PSPMT) with a scintillation crystal array, a high spatial resolution may be achieved. The position-sensitive photomultiplier tube with high gain ($10^6$) and low noise may facilitate an extremely high spatial resolution. There is a team which has implemented small animal PET systems with extremely high spatial resolution requirement by means of the coupling method (see Luyao Wang, Jun Zhu, Xiao Liang, Ming Niu, Xiaoke Wu, Chien-Min Kao, Heejong Kim and Qingguo Xie, "Performance evaluation of the Trans-PET® BioCaliburn® LH system-A large FOV small-animal PET system", Physics in Medicine and Biology [J], 2014), and the system has achieved a favorable performance.

Secondly, by directly coupling an avalanche photodiode array (abbr. APD array) with a scintillation crystal array of the same dimension, a high spatial resolution may also be achieved. The position-sensitive APD has a small size, requires relatively low voltage during normal operation, and allows flexibility in setting up a PET detector, which may reduce the difficulty in system integration engineering. There is a team which has implemented small animal PET systems with a relatively high spatial resolution by means of the coupling method (see Bergeron M, Cadorette J, Beaudoin J F, et al. Performance Evaluation of the LabPET APD-Based Digital PET Scanner [J]. IEEE Transactions on Nuclear Science, 2009, 56 (1): 10-16).

Thirdly, a PET detector may be built by 1:1 directly coupling a silicon photomultiplier tube array (abbr. SiPM array) with a scintillation crystal array of the same size. A silicon photomultiplier tube has a gain of $10^6$ comparable to the PMT, with low noise, small size, compact arrangement, and good time performance. When using an SiPM array to build a PET detector, the signal-to-noise ratio of the tip detector output signal is high, and the detector is flexible, which can also reduce the engineering difficulty of system integration. As a semiconductor device, SiPM array has the advantage of low price in mass production, which is especially suitable for the instrument or equipment including a large number of detectors, such as PET. There is a team which has implemented the design and production of PET detectors by 1:1 direct coupling of the SiPM array and the scintillation crystal array, and have integrated the system, realizing the PET system spatial resolution of approx. 2.5 mm (see Daoming Xi, Jingjing Liu, Yanzhao Li, Jun Zhu, Ming Niu, Peng Xiao, Qingguo Xie, "Investigation of continuous scintillator/SiPM detector for local extremely high spatial resolution PET", in Conference Record of the 2011 IEEE Nuclear Science Symposium and Medical Imaging Conference [C], pp. 4429-4432, 2011).

However, there are still several shortcomings in the above-mentioned designs of nuclear detector. For example, for the first type of nuclear detector based on PSPMT coupled to scintillation crystal array, its photomultiplier tube is very expensive. For the PET system with thousands of channels, there are so many detectors, leading to extremely high costs of devices.

Further, the photomultiplier tube is bulk in its shape, which does not meet the requirement of flexibility to build up the system. Moreover, the operation of photomultiplier tube usually requires a high voltage up to about 1000 volts, which will increase the engineering difficulty in PET system integration. For the second type of nuclear detector that comprises the APD array coupled to the scintillation crystal, the signal-to-noise ratio of the electric pulse signals generated by the tip detector will be lowered due to the APD's natural defects of low gain and loud noise, affecting the electronic readout effect and thus deteriorating the performance of the PET detector. For the third type of PET detector comprised of a silicon photomultiplier tube array and a scintillation crystal array of the same size coupled to each other by means of 1:1 direct coupling, although relatively favorable energy resolution and time resolution may be realized, the spatial resolution thereof is limited by the size of the silicon photomultiplier tube in view of the coupling and it is difficult to further improve the spatial resolution of the PET detector by cutting out smaller crystal bars in the crystal array.

In summary, in the state of art the nuclear detectors based on the PSPMT coupled to scintillation crystal array is not only expensive, but also have low system integration flexibility and high engineering difficulty. Although it can be used in the PET system with high spatial resolution, the research and development costs and production costs are relatively high. The nuclear detector based on the APD array coupled to the scintillation crystal has poor signal-to-noise ratio of the signals due to the APD's low gain, which will deteriorate the performance of the PET detector. The PET detector based on the SiPM array coupled to the scintillation crystals by means of 1:1 direct coupling shares the advantages of the above two types. However, a high-spatial-resolution nuclear detector with dissected crystal bars of less than 2 mm is hardly realized, due to the limitation of the size of the single SiPM of the SiPM array.

In view of the technical problems, therefore, it is necessary to propose a nuclear detector with low cost, high system integration flexibility, and high spatial resolution, in order to overcome the above defects.

SUMMARY

In the disclosure the purpose is to provide a nuclear detector, thereby solving the problems of high cost, low system integration flexibility or low spatial resolution of the nuclear detector in the state of art.

To solve the above problems, provided is a nuclear detector comprising a scintillation crystal array including a plurality of scintillation crystal bars of the same size arranged closely in sequence, a light guide, and a photodetector array including a plurality of photodetectors arranged in sequence, wherein the photodetectors have a cross-sectional area greater than that of the scintillation crystal bars, wherein the light guide includes a top surface coupled to the scintillation crystal array, an opposed bottom surface coupled to the photodetector array and a side surface. The light guide has a thickness in a range of 0.1 mm to 40 mm. The light guide further includes a slit adjacent to an edge of the light guide. The slit is configured to extend from the top surface of the light guide toward the bottom surface of the light guide and the slit has a depth in a range of 0.1 to 0.5 times the thickness of the light guide.

In an embodiment of the disclosure, the light guide has a shape of cuboid, and the slit has an extending direction perpendicular to the top surface and the bottom surface of the light guide.

In an embodiment of the disclosure, the slit is spaced from the side surface of the light guide in a distance of 1.1 and 1.9 times a width of the scintillation crystal bar.

In an embodiment of the disclosure, the light guide is in the shape of a truncated cone with an area of the top surface of the light guide greater than an area of the bottom surface of the light guide, and the slit has an extending direction parallel to the side surface of the truncated cone.

In an embodiment of the disclosure, the slit includes a first slit spaced from the side surface of the light guide in a distance equal to a width of the scintillation crystal bar, and a second slit spaced from the side surface of the light guide in a distance of two times the width of the scintillation crystal bar, and the first slit has a depth greater than a depth of the second slit.

In an embodiment of the disclosure, the number of the slits is in a range of 1 to 40, and the slits are sequentially arranged from the side surface of the light guide toward the center of the light guide, with the depth of the slits gradually decreased from the side surface of the light guide toward the center of the light guide.

In an embodiment of the disclosure, the scintillation crystal bars have a width in a range of 0.5 mm to 4 mm.

In an embodiment of the disclosure, the scintillation crystal bars have a side surface coated with an opaque material.

In an embodiment of the disclosure, the opaque material is barium sulfate powders or a specular reflection film.

In an embodiment of the disclosure, the slit and the side surface of the light guide are coated with an opaque material.

In an embodiment of the disclosure, the opaque material is black paint.

In an embodiment of the disclosure, the light guide comprises 1 to 4 layers, and the respective layers of light guide have a collective thickness in a range of 0.1 mm to 40 mm.

In the nuclear detector provided in the disclosure, in the event that the scintillation crystal bars in the scintillation crystal array is significantly smaller than the photodetectors, that is, no 1:1 direct coupling between the scintillation crystal bars and the photodetectors can be realized, arranged therebetween is a light guide with slits, enabling a nuclear detector with a high spatial resolution. Because of the relatively thin thickness of the light guide, there is little scintillation photon loss of the scintillation crystals, thus leading to little loss in the signal-to-noise ratio of the scintillation photon. Therefore, the high spatial resolution of the nuclear detector can be realized without compromising the performance of the nuclear detector, such that the energy resolution and the coincidence time resolution of the nuclear detector fulfills the needs of PET detector, which is easy to be produced or manufactured cost-effectively.

DETAILED DESCRIPTION

In the following, the invention will be described further with reference to embodiments. It should be understood that the following embodiments are for illustrative instead of limitative purpose only.

Figure 1:
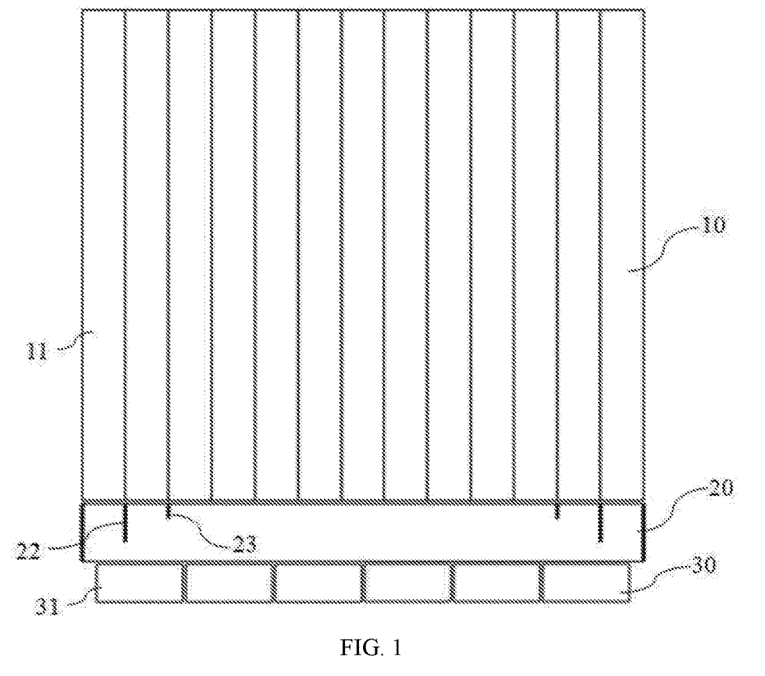
FIG. 1 is a schematic front view of a nuclear detector according to a preferred embodiment of the disclosure.
Figure 2:
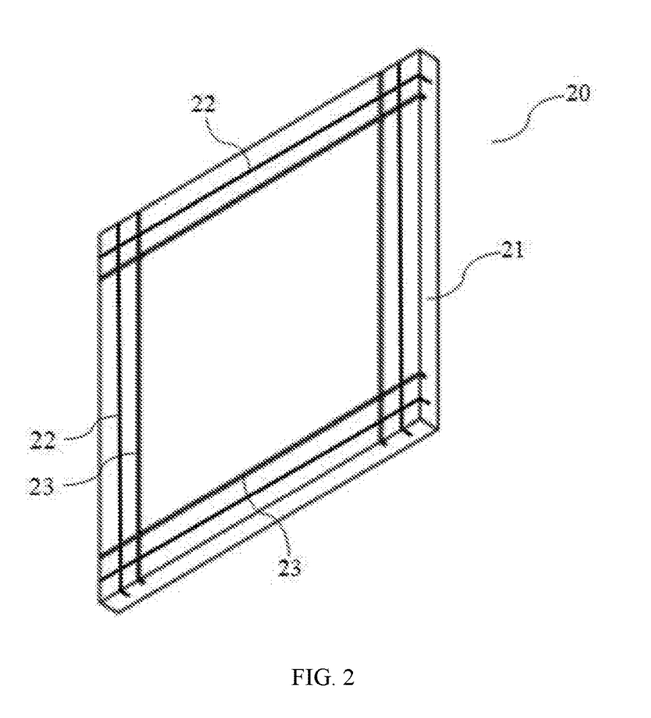
FIG. 2 is a schematic perspective view of a light guide of the nuclear detector according to FIG. 1.

FIG. 1 is a schematic front view of a nuclear detector according to a preferred embodiment of the disclosure. FIG. 2 is a schematic perspective view of a light guide of the nuclear detector according to FIG. 1. Referring to FIG. 1 and FIG. 2, in the disclosure the nuclear detector is provided and comprises a scintillation crystal array 10, a light guide 20, and a photodetector array 30. The light guide 20 is disposed between, and respectively coupled to, the scintillation crystal array 10 and the photodetector array 30. Specifically, the scintillation crystal array 10 includes m×n closely arranged scintillation crystal bars 11 of the same size, in which m and n are natural numbers not less than 5. The individual scintillation crystal bar 11 is a six-side polished cuboid. The side surfaces of the individual scintillation crystal bar 11 are coated with an opaque, diffuse reflection material, such as $BaSO_4$ powders or a specular reflection film. The bottom surfaces of the individual scintillation crystal bars 11 collectively form the bottom surface of the scintillation crystal array 10. As shown in FIG. 2, the light guide 20 comprises a light guide body 21, a first slit 22, and a second slit 23. The light guide body 21 has a shape of cuboid. The top surface of the light guide 20 is coupled to the bottom surface of the scintillation crystal array 10. The area of the top surface of the light guide 20 is equal to the area of the bottom surface of the scintillation crystal array 10. Provided in the top surface of the light guide 20 are four first slits 22 parallel to four sides of the top surface of the light guide 20, respectively, and four second slits 23 also parallel to the four sides of the top surface of the light guide 20, respectively. The first slits 22 and the second slits 23 extend from the top surface of the light guide 20 in a thickness direction of the light guide 20 toward inside of the light guide 20, and the four second slits 23 are arranged more closely to the center of the light guide 20 than the four first slits 22. In the embodiment shown in FIG. 1, the first slits 22 are spaced from the edges of the light guide 20 in a distance equal to the width of the single scintillation crystal bar 11, and the first slits 22 are spaced from the second slits 23 in a distance equal to the width of the single scintillation crystal bar 11 too. The depth of the first slits 22 is greater than the depth of the second slits 23. The top surface of the photodetector array 30 is coupled to the bottom surface of the light guide 20. The photodetector array 30 includes x×y photodetectors 31 of the same size arranged in sequence, in which both x and y are natural numbers. The cross-sectional area of the single photodetector is greater than the cross-sectional area of the single scintillation crystal bar 11, and the top surface area of the photodetector array 30 is less than the bottom surface area of the light guide 20.

More specifically, in the embodiment shown FIG. 1, the scintillation crystal array 10 is formed of 13×13 individual scintillation crystal bars 11. The scintillation crystal bars 11 are made from Lutetium Yttrium Orthosilicate (abbr. LYSO) scintillation crystal. The single scintillation crystal bar has a size of 1.89 mm×1.89 mm×13 mm, while scintillation crystal array 10 has an overall size of 26.5 mm×26.5 mm×13.3 mm. $BaSO_4$ powders are applied in between the respective scintillation crystal bars 11. The light guide 20 has a thickness of 1.4 mm. The first slits 22 have a width of 0.2 mm, and a depth of 1.0 mm. The second slits 23 have a width of 0.2 mm, and a depth of 0.4 mm. The first slits 22 and the second slits 23 are filled with opaque materials, such as opaque, black paint. It is worth noting that the side surfaces of the light guide 20 are also coated with opaque materials, allowing to a better light guiding effect. The photodetector array 30 comprises 6×6 silicon photomultiplier tubes 31. The single silicon photomultiplier tube 31 has a size of 4 mm×4 mm×0.65 mm. A gap is formed in between the adjacent silicon photomultiplier tubes 31, with a gap width of 0.2 mm.

Figure 3:
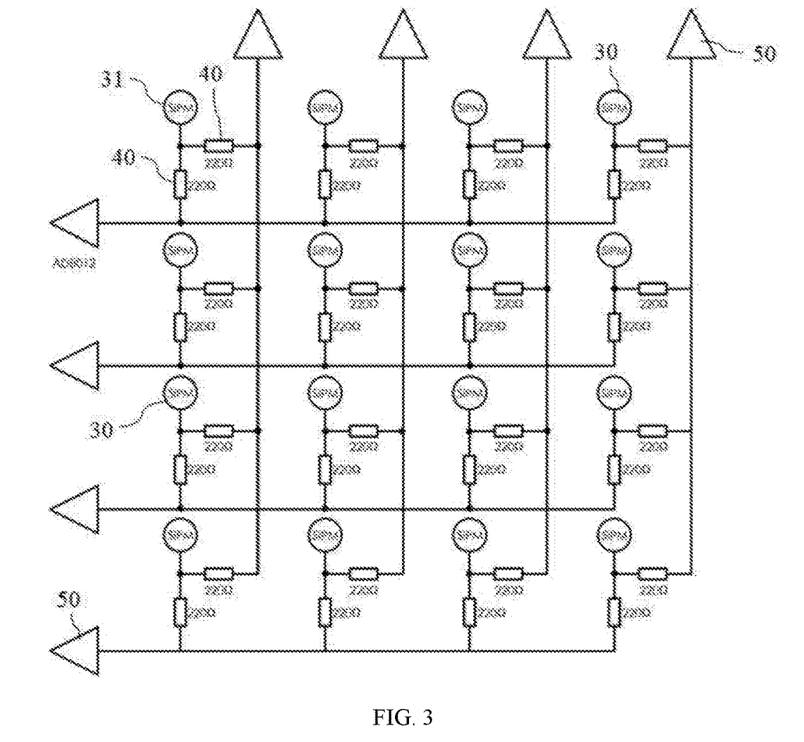
FIG. 3 is a schematic diagram of a multiplex circuit of the nuclear detector according to FIG. 1.

FIG. 3 is a schematic diagram of the multiplex circuit of the nuclear detector according to FIG. 1. As can be seen from FIG. 3, the multiplex circuit of the nuclear detector in the disclosure may be configured as an equalized charge distribution circuit. The circuit includes 16 channels and in each channel the scintillation pulse signal of the silicon photomultiplier tube 31 is firstly going through equalized charge distribution by two resistors 40 of which a resistance is of 220 ohms, thus generating 8-way weighted signals 50. The equalized charge distribution circuit allows that x×y ways of scintillation pulse signals of the silicon photomultiplier tube 31 can be reduced to x+y ways of signals. Finally, a position spectrum may be generated by means of Anger algorithm. It is worth noting that the Anger algorithm is conventionally used in the state of art and will not be elaborated here.

Figure 4:
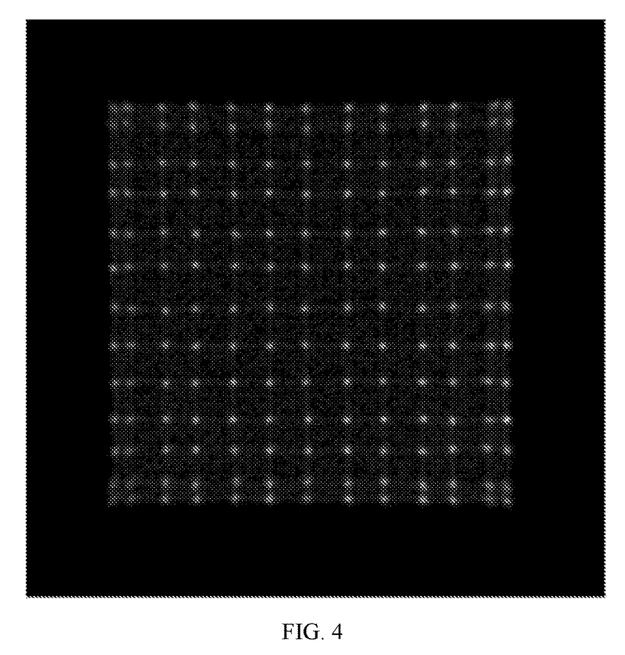
FIG. 4 is a schematic diagram of crystal position spectrums of the nuclear detector according to FIG. 1.

FIG. 4 is a schematic diagram of crystal position spectrums of the nuclear detector according to an embodiment in the disclosure. As can be seen from FIG. 4, the scintillation pulse signal generated by the silicon photomultiplier tube 31 is processed by the multiplex circuit, and then is further processed by multi-threshold (MVT) digitalization. Unlike the traditional ADC method in which voltage is sampled at fixed time, the MVT digital method comprises pre-setting multiple voltage thresholds in the system, recording the time when the scintillation pulse signals reach each voltage threshold, and further using the priori knowledge of the scintillation pulse model to obtain time, energy, baseline drift and decay time information of the scintillation pulse signals by fitting, such that the position information can be obtained by means of the energy information. FIG. 4 is a position spectrum image of the nuclear detector of FIG. 1, obtained by the MVT digital method. FIG. 4 clearly illustrates the position spectrums of the 13×13 crystals of the nuclear detector.

Figure 5:
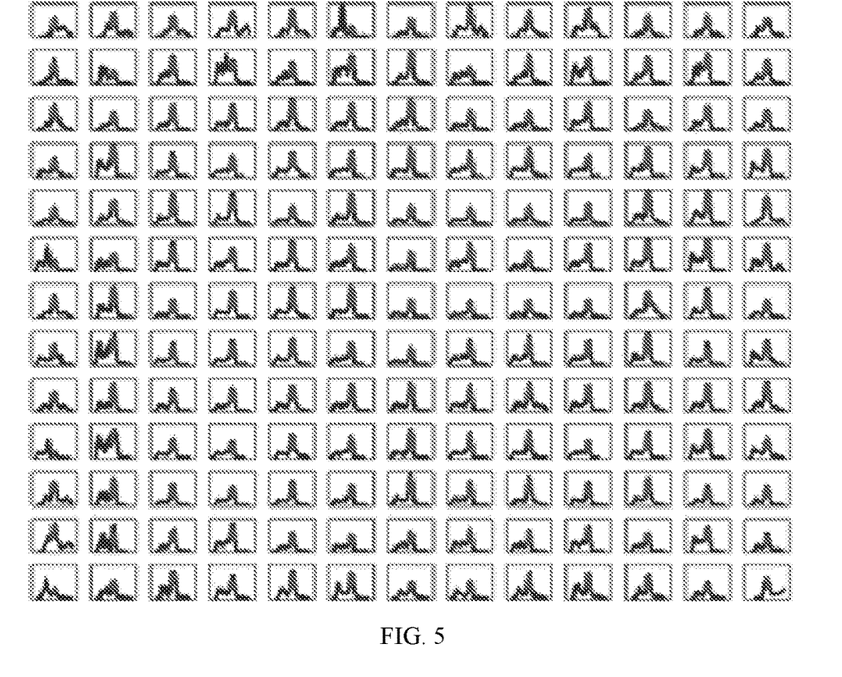
FIG. 5 is a schematic diagram of energy spectrums of the nuclear detector according to FIG. 1.
Figure 6:
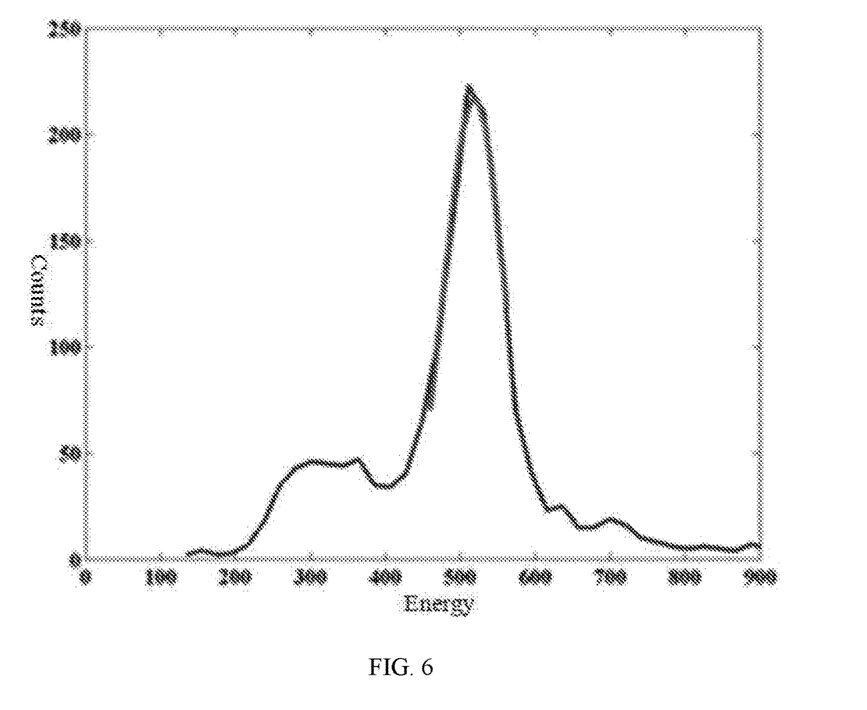
FIG. 6 is a schematic diagram of an energy spectrum of a central scintillation crystal bar according to the nuclear detector of FIG. 5.
Figure 7:
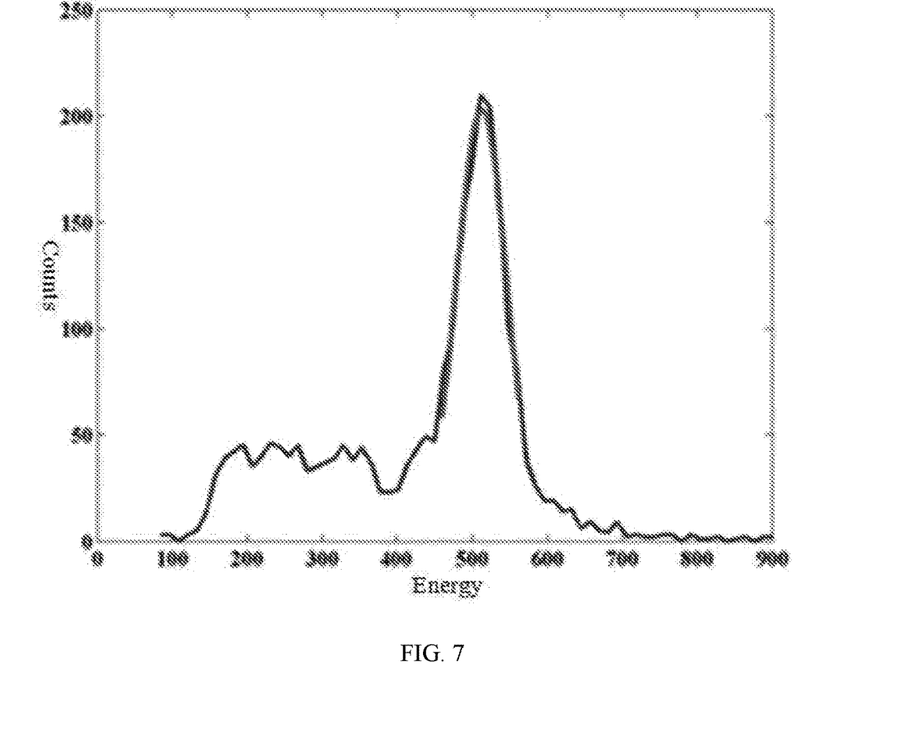
FIG. 7 is a schematic diagram of an energy spectrum of a peripheral scintillation crystal bar of the nuclear detector according to FIG. 5.
Figure 8:
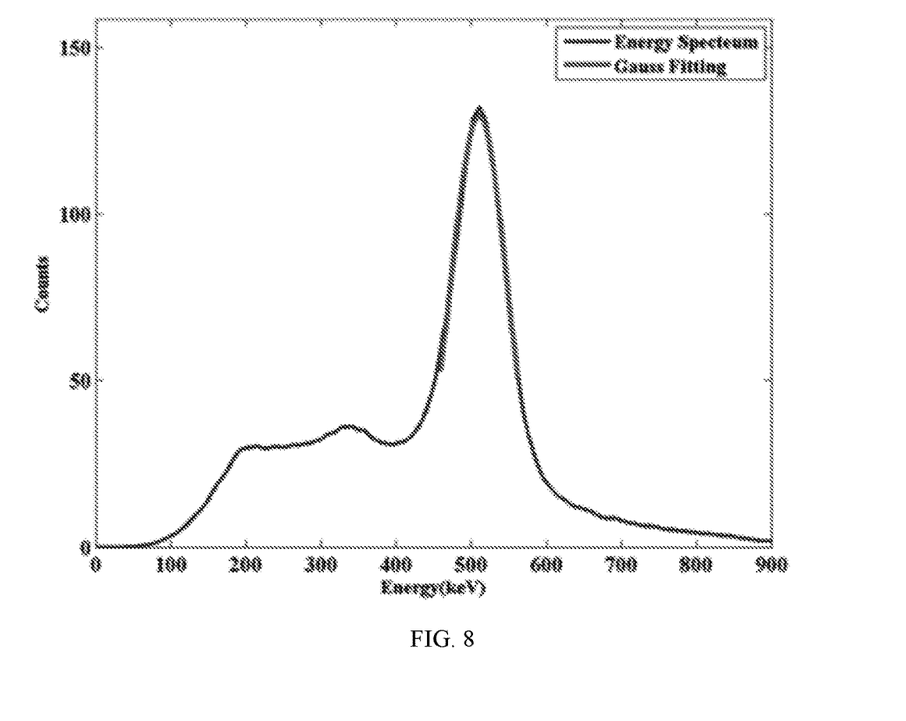
FIG. 8 is a schematic diagram of an average energy spectrum of the scintillation crystal bars according to the nuclear detector of FIG. 5, wherein an average energy resolution of the scintillation crystal bars is 14.8%.

FIG. 5 shows the energy spectrums of the 13×13 scintillation crystal bars, obtained by using the position look-up table algorithm in the SiPM-based nuclear detector according to FIG. 1. As can be seen from FIG. 5, the energy resolution of each scintillation crystal bar can be obtained by means of Gaussian fitting, with the energy resolution of the single scintillation crystal bar in the range of 12.9% to 30.1%. FIG. 6 is a schematic diagram of the energy spectrum of the central scintillation crystal bar according to the nuclear detector of FIG. 5. FIG. 7 is a schematic diagram of the energy spectrum of the peripheral scintillation crystal bar of the nuclear detector according to FIG. 5. By comparing FIG. 6 with FIG. 7, the energy resolution of the scintillation crystal bar at the edge of the nuclear detector is lower than that of the scintillation crystal bar at the center of the nuclear detector. FIG. 8 is a schematic diagram of an average energy spectrum of the scintillation crystal bars according to the nuclear detector of FIG. 5. As can be seen from FIG. 8, an average energy resolution of the 13×13 scintillation crystal bars is 14.8%.

Figure 9:
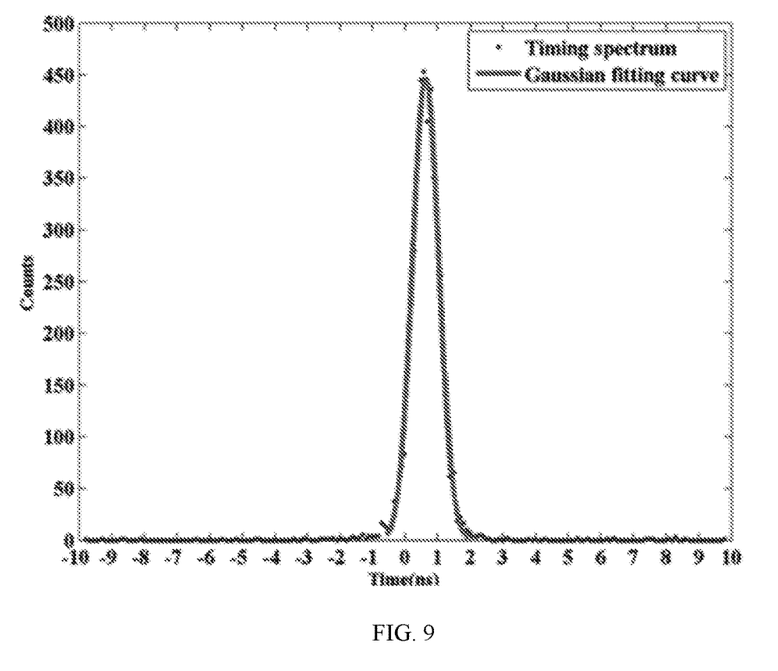
FIG. 9 is a schematic diagram of the coincidence time resolution of the nuclear detector according to FIG. 5, in which the coincidence time resolution is 941.4 ps (picosecond)

FIG. 9 is a schematic diagram of the coincidence time resolution of the nuclear detector according to FIG. 5. As can be seen from FIG. 9, the statistics of 4573 pairs of adjacent lines of response (abbr. LOR, Line of Response) sampled in the SiPM-based nuclear detectors opposite to each other are consistent with the time distribution spectrum. All events are filtered through the energy window of 350-650 keV. The coincidence time resolution obtained by means of Gaussian fitting is 941.4 ps.

Figure 10:
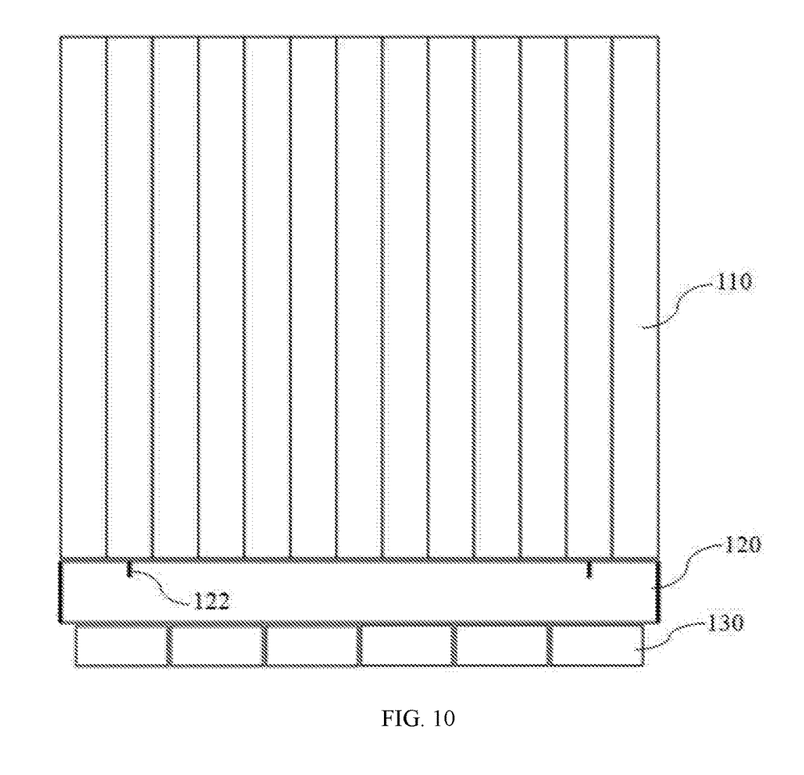
FIG. 10 is a schematic front view of a nuclear detector according to another embodiment of the disclosure.

FIG. 10 is a schematic front view of a nuclear detector according to another embodiment of the disclosure. In the embodiment shown in FIG. 10, the scintillation crystal array 110 and the photodetector array 130 of the nuclear detector are the same as those in the embodiment shown in FIG. 1, respectively, which thus will not be elaborated. The differences lie in that in the embodiment shown in FIG. 10, provided in the top surface of the light guide 120 are only four first slits 122, which are cut parallel to the four sides of the top surface of the light guide 120, respectively. The slits 122 extend from the top surface of the light guide 120 toward inside of the light guide 120 in the thickness direction of the light guide 120. The four first slits 122 are spaced from the respective edges of the light guide 120 in a distance of 1.1-1.9 times the width of the scintillation crystal bar. The first slits 122 have a depth in a range of 0.1-0.5 times the thickness of the light guide 120. For example, in the embodiment shown in FIG. 10, the first slits 120 are spaced from the respective edges of the corresponding light guide 120 in a distance of 1.5 times the width of the scintillation crystal bar. The first slits 122 have a depth of 0.4 mm and the light guide 120 has a thickness of 1.4 mm.

Figure 11:
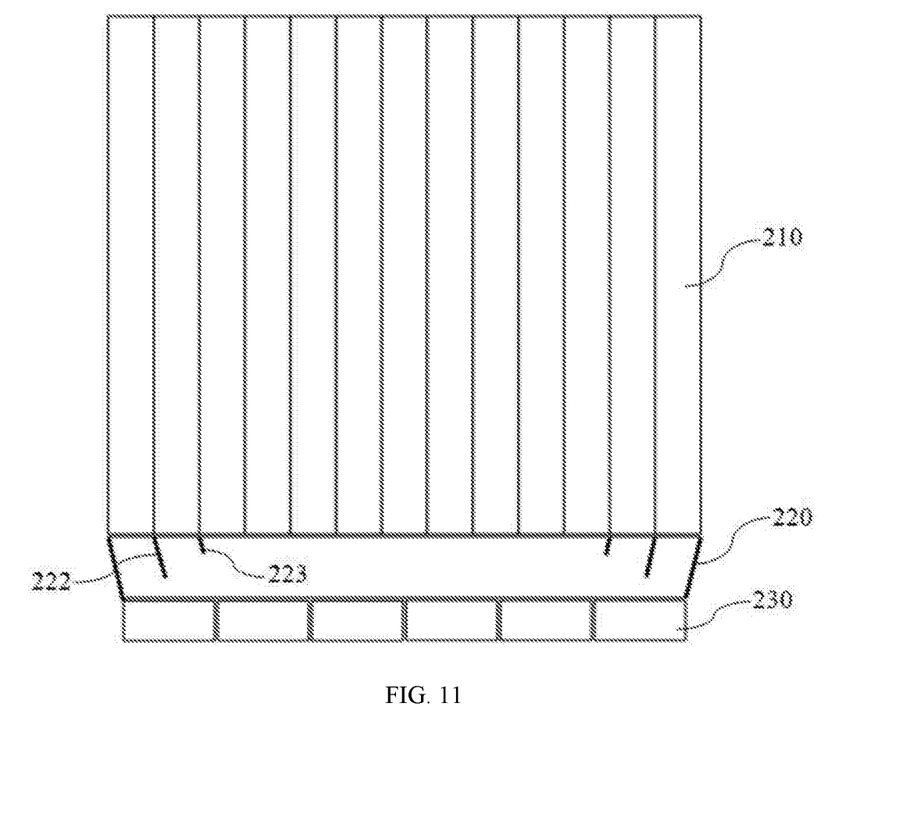
FIG. 11 is a schematic front view of a nuclear detector according to yet another embodiment of the disclosure.

FIG. 11 is a schematic front view of a nuclear detector according to yet another embodiment of the disclosure. In the embodiment shown in FIG. 11, the scintillation crystal array 210 and the photodetector array 230 of the nuclear detector are the same as those in the embodiment shown in FIG. 1, respectively, which thus will not be elaborated. The differences lie in that in the embodiment shown in FIG. 11, the light guide 220 has a shape of truncated cone, including a top surface, an opposed bottom surface, and four side surfaces. The top surface area of the light guide 220 is greater than the bottom surface area, which is equal to the top surface area of the photodetector array 230. Provided in the top surface of the light guide 220 are four first slits 222 and four second slits 223. The planes where the first and second slits 222 and 223 are located are parallel to the four side surfaces of the light guide 220, respectively. The four first slits 222 are spaced from the respective side surfaces of the light guide 220 in a distance equal to the width of the single scintillation crystal bar, while the four second slits 223 are spaced from the respective side surfaces of the light guide 220 in a distance of two times the width of the single scintillation crystal bar. The first slits 222 have a depth greater than that of the second slits 223. For example, in the embodiment shown in FIG. 11, the first slits 222 have a width of 0.2 mm and a depth of 1.0 mm, and the second slits 223 have a width of 0.2 mm and a depth of 0.4 mm.

According to an embodiment of the disclosure, the material used for the light guide may be a transparent element such as ordinary inorganic glass, organic glass, or scintillation crystal.

According to an embodiment of the disclosure, the light guide may comprise 2 to 4 layers, and the respective layers of light guide have a collective thickness in a range of 0.1 mm to 40 mm.

According to an embodiment of the disclosure, the light guide may have a shape of a truncated circular cone, a cylinder, or a cone-like polyhedron. The width or diameter of the light guide may be in between the width of the scintillation crystal array and the width of the photodetector array.

According to an embodiment of the disclosure, the opaque material filled in the first slits or the second slits of the light guide may also include a specular reflective film (aka. ESR, Enhanced Specular Reflector).

According to another embodiment of the disclosure, the number of slits of the light guide may be greater than two, but no more than 40.

According to an embodiment of the disclosure, the scintillation crystal bar may be an inorganic scintillation crystal, including bismuth germanate, lutetium oxyorthosilicate, lanthanum bromide, lutetium yttrium orthosilicate, lutetium oxyorthosilicate, barium fluoride, sodium iodide, cesium iodide or the like.

According to another embodiment of the disclosure, the width of the single scintillation crystal bar in the scintillation crystal array is in a range of 0.5 mm to 4 mm.

According to an embodiment of the disclosure, the photodetectors in the photodetector array may be further selected from any of avalanche photodiodes (APD), multi-pixel photon counters (MPPC), and Geiger avalanche photodiodes (G-APD).

In the nuclear detector provided in the disclosure, in the event that the scintillation crystal bars in the scintillation crystal array is significantly smaller than the photodetectors, that is, no 1:1 direct coupling between the scintillation crystal bars and the photodetectors can be realized, arranged therebetween is a light guide with slits, enabling a nuclear detector with a high spatial resolution. Because of the relatively thin thickness of the light guide, there is little scintillation photon loss of the scintillation crystals, thus leading to little loss in the signal-to-noise ratio of the scintillation photon. Therefore, the high spatial resolution of the nuclear detector can be realized without compromising the performance of the nuclear detector, such that the energy resolution and the coincidence time resolution of the nuclear detector fulfills the needs of PET detector, which is easy to be produced or manufactured.

What has been described above is only preferred embodiments of the invention, not for limiting the scope of the invention. Various alternatives may be made to the said embodiments of the invention. In this regard, any simple or equivalent change or modification made according to the claims and the description falls within the scope of invention as prescribed in the claims. What is not described in detail in the disclosure is conventional.

What is claimedd is:

1. A nuclear detector, comprising:
a scintillation crystal array including a plurality of scintillation crystal bars of the same size arranged in sequence;
a light guide;
a photodetector array including a plurality of photodetectors arranged in sequence, wherein the photodetectors have a cross-sectional area greater than that of the scintillation crystal bars;
wherein the light guide includes a top surface coupled to the scintillation crystal array, an opposed bottom surface coupled to the photodetector array and a side surface;
the light guide has a thickness in a range of 0.1 mm to 40 mm; and
the light guide further includes a slit adjacent to an edge of the light guide, and the slit is configured to extend from the top surface of the light guide toward the bottom surface of the light guide and the slit has a depth in a range of 0.1 to 0.5 times the thickness of the light guide.

2. The nuclear detector of claim 1, wherein the light guide has a shape of cuboid, and the slit has an extending direction perpendicular to the top surface and the bottom surface of the light guide.

3. The nuclear detector of claim 2, wherein the slit is spaced from the side surface of the light guide in a distance of 1.1 and 1.9 times a width of the scintillation crystal bar.

4. The nuclear detector of claim 3, wherein the slit includes a first slit spaced from the side surface of the light guide in a distance equal to a width of the scintillation crystal bar, and a second slit spaced from the side surface of the light guide in a distance of two times the width of the scintillation crystal bar, and the first slit has a depth greater than a depth of the second slit.

5. The nuclear detector of claim 2, wherein the slit includes a first slit spaced from the side surface of the light guide in a distance equal to a width of the scintillation crystal bar, and a second slit spaced from the side surface of the light guide in a distance of two times the width of the scintillation crystal bar, and the first slit has a depth greater than a depth of the second slit.

6. The nuclear detector of claim 1, wherein the light guide is in the shape of a truncated cone with an area of the top surface of the light guide greater than an area of the bottom surface of the light guide, and the slit has an extending direction parallel to the side surface of the truncated cone.

7. The nuclear detector of claim 6, wherein the slit includes a first slit spaced from the side surface of the light guide in a distance equal to a width of the scintillation crystal bar, and a second slit spaced from the side surface of the light guide in a distance of two times the width of the scintillation crystal bar, and the first slit has a depth greater than a depth of the second slit.

8. The nuclear detector of claim 1, wherein the number of the slits is in a range of 1 to 40, and the slits are sequentially arranged from the side surface of the light guide toward the center of the light guide, with the depth of the slits gradually decreased from the side surface of the light guide toward the center of the light guide.

9. The nuclear detector of claim 1, wherein the scintillation crystal bars have a width in a range of 0.5 mm to 4 mm.

10. The nuclear detector of claim 1, wherein the scintillation crystal bars have a side surface coated with an opaque material.

11. The nuclear detector of claim 10, wherein the opaque material is barium sulfate powders or a specular reflection film.

12. The nuclear detector of claim 1, wherein the slit and the side surface of the light guide are coated with an opaque material.

13. The nuclear detector of claim 12, wherein the opaque material comprises a black paint.

14. The nuclear detector of claim 1, wherein the light guide comprises 1 to 4 layers, and the respective layers of light guide have a collective thickness in a range of 0.1 mm to 40 mm.

15. A nuclear detector, comprising:
a scintillation crystal array including a plurality of scintillation crystal bars of the same size arranged in sequence;
a light guide;
a photodetector array including a plurality of photodetectors arranged in sequence, wherein the photodetectors have a cross-sectional area greater than that of the scintillation crystal bars;
wherein the light guide includes a top surface coupled to the scintillation crystal array, an opposed bottom surface coupled to the photodetector array and a side surface;
the light guide has a thickness in a range of 0.1 mm to 40 mm;
the light guide further includes a first slit spaced from the side surface of the light guide in a distance equal to a width of the scintillation crystal bar, and a second slit spaced from the side surface of the light guide in a distance of two times the width of the scintillation crystal bar, and the first slit and second slit are configured to extend from the top surface of the light guide toward the bottom surface of the light guide; and
wherein the first slit has a depth in a range of 0.1 to 0.5 times the thickness of the light guide, the second slit has a depth in a range of 0.1 to 0.5 times the thickness of the light guide and the first slit has a depth greater than a depth of the second slit.

16. The nuclear detector of claim 15, wherein the light guide has a shape of cuboid, and the slit has an extending direction perpendicular to the top surface and the bottom surface of the light guide.

17. The nuclear detector of claim 15, wherein the light guide is in the shape of a truncated cone with an area of the top surface of the light guide greater than an area of the bottom surface of the light guide, and the slit has an extending direction parallel to the side surface of the truncated cone.

18. A nuclear detector, comprising:
a scintillation crystal array including a plurality of scintillation crystal bars of the same size arranged in sequence;
a light guide;
a photodetector array including a plurality of photodetectors arranged in sequence, wherein the photodetectors have a cross-sectional area greater than that of the scintillation crystal bars;
wherein the light guide includes a top surface coupled to the scintillation crystal array, an opposed bottom surface coupled to the photodetector array and a side surface;
the light guide has a thickness in a range of 0.1 mm to 40 mm; and
the light guide further includes 2 to 40 slits adjacent to an edge of the light guide and sequentially arranged from the side surface of the light guide toward the center of the light guide, and the slits are configured to extend from the top surface of the light guide toward the bottom surface of the light guide and the slits have a depth in a range of 0.1 to 0.5 times the thickness of the light guide with the depth of the slits gradually decreased from the side surface of the light guide toward the center of the light guide.

19. The nuclear detector of claim 18, wherein the light guide has a shape of cuboid, and the slit has an extending direction perpendicular to the top surface and the bottom surface of the light guide.

20. The nuclear detector of claim 18, wherein the light guide is in the shape of a truncated cone with an area of the top surface of the light guide greater than an area of the bottom surface of the light guide, and the slit has an extending direction parallel to the side surface of the truncated cone.

* * * * *